Patented Aug. 26, 1952

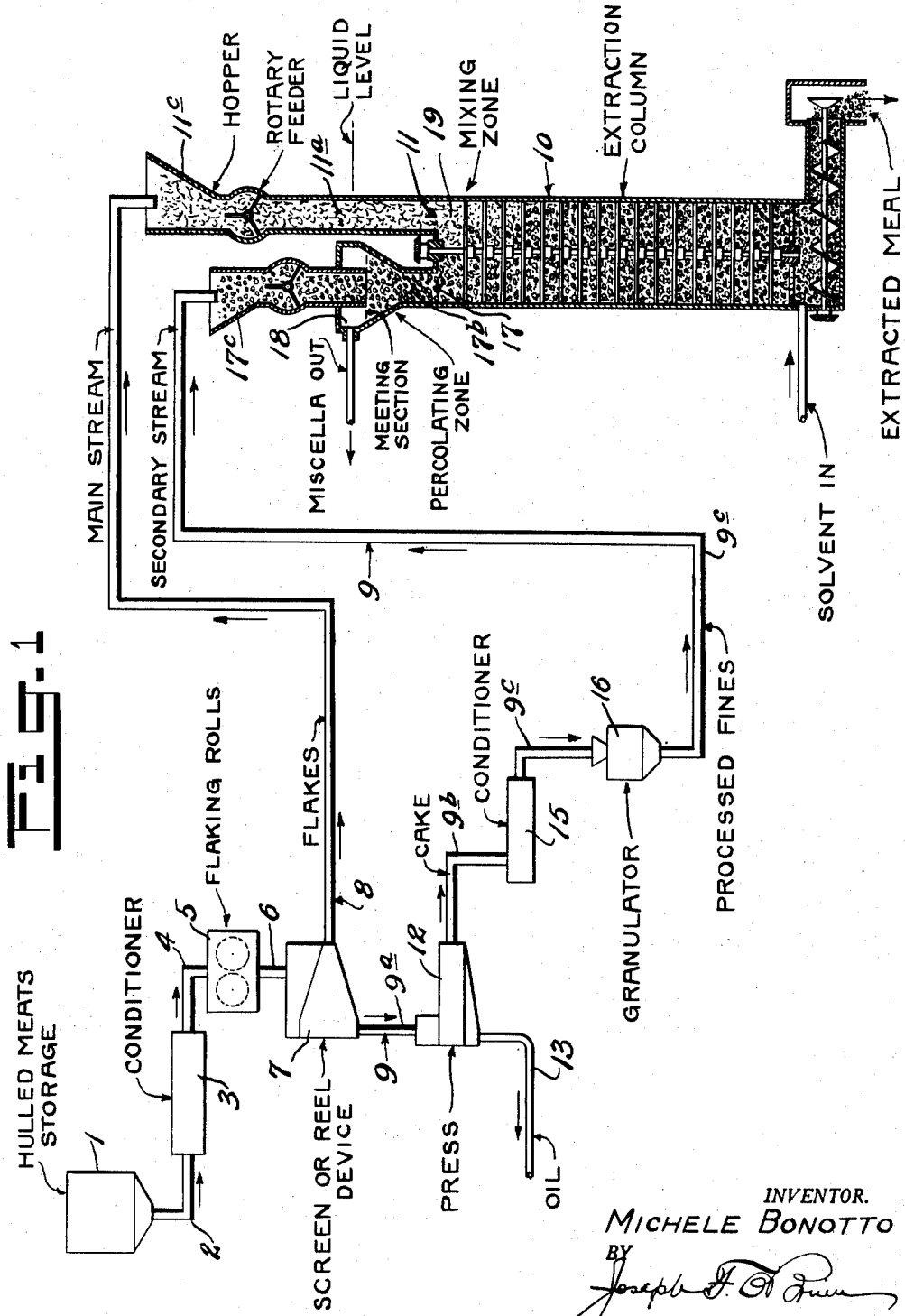

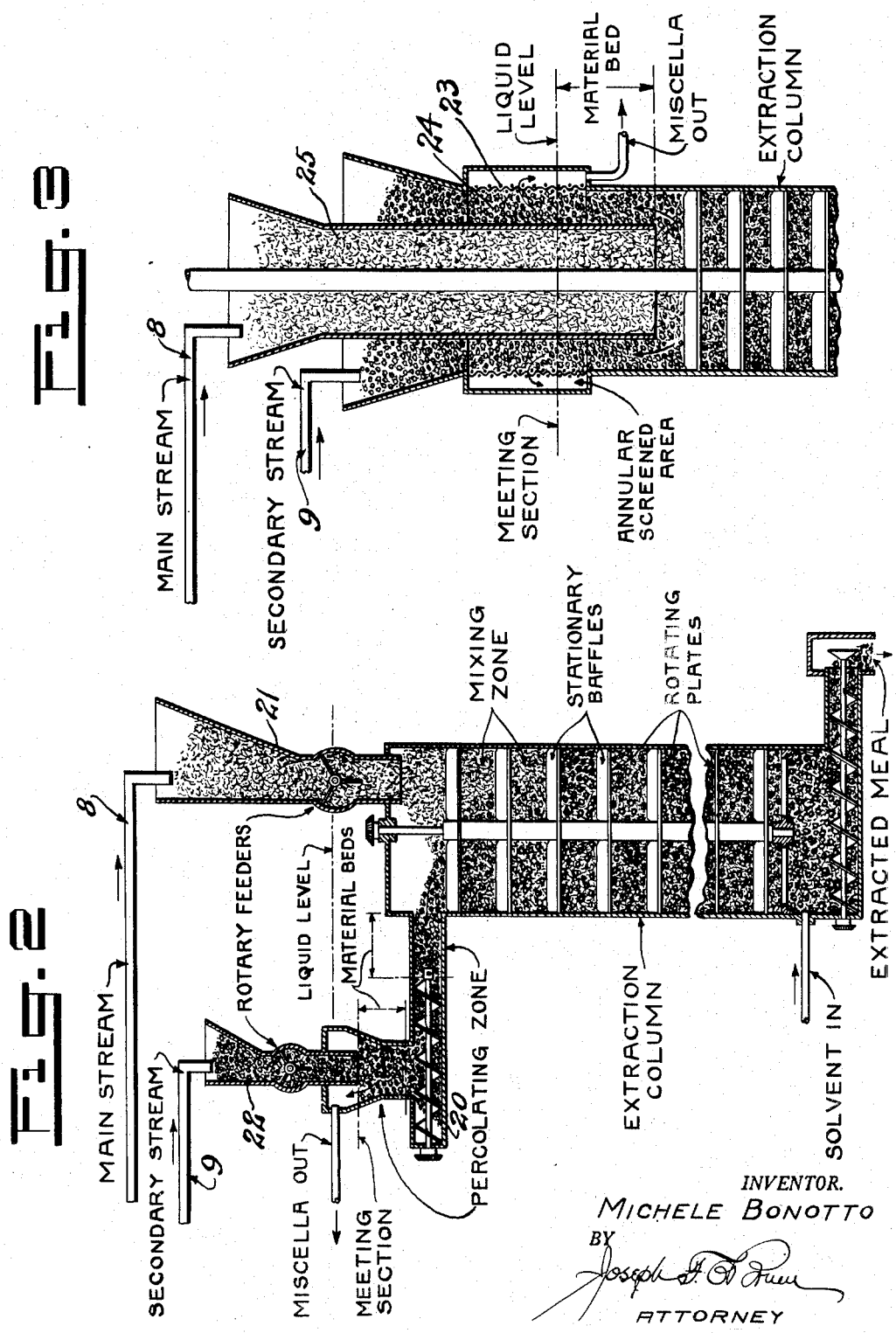

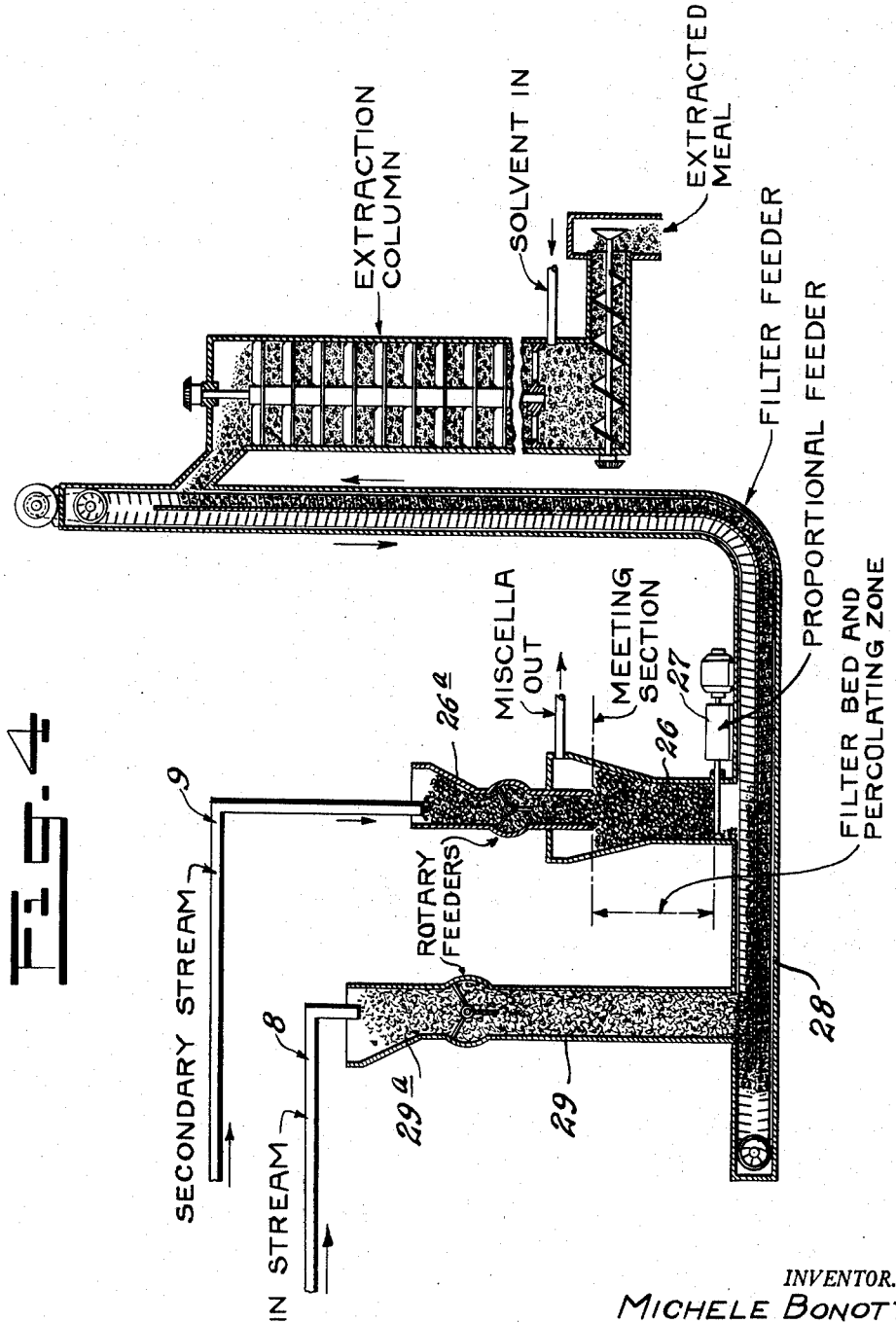

2,608,565

UNITED STATES PATENT OFFICE 2,608,565

PROCESS FOR UTILIZING PREPARED OIL-BEARING MATERIAL AS A FILTERING AGENT IN SOLVENT EXTRACTION BY CONTINUOUS COUNTERCURRENT FLOW

Michele Bonotto, Princeton, N. J.

Application July 2, 1949, Serial No. 102,743

2 Claims. (Cl. 260—412.4)

This invention relates to improvements in process for utilizing prepared oil bearing material as a filtering agent in solvent extraction by continuous countercurrent flow.

My present invention is particularly useful in cases where the mechanical characteristics of the extraction apparatus has a tendency to break down the material under process and thus to create fines, and/or when the material has a tendency to disintegrate when it is in contact with the solvent, and/or when it is desired to have the miscella filtered to a higher degree than it is possible to obtain through the use of the process disclosed in my said companion application Ser. No. 102,742, filed July 2, 1949. I have found that by separating a portion preferably comprising the finer particles of the original material destined for continuous solvent extraction and by processing this portion in a special way so as to give it a different physical form and different characteristics than those of the original material (viz., by pressing or compressing the said finer particles mechanically into cake form and then treating or processing the cake to produce a coarser product of greater specific gravity than the original material), and then by continuously conveying this prepared material as an independent secondary stream into the extractor through a separate inlet and also forcing the outgoing miscella to flow in countercurrent through a mass or body of this prepared material, I am enabled to efficiently filter and entrap the fines in material passing through a main stream and being extracted, and find that such fines will be conveyed back toward the outlet for process material of the extraction and that the carry-over of fines by the miscella through the meeting section is greatly reduced with the result that the discharged miscella is substantially free of suspended solids or fines.

One way or method of preparing this physically different material is to first screen or sieve all the fine particles below a desired size from a given source of oil-bearing material prepared in suitable form for extraction to provide a main stream of relatively large size that is free from fines and a secondary stream containing the said finer solid particles. This may be accomplished by the use of a suitable device such as a screen. The finer particles or fines thus separated are processed separately and their physical form substantially changed so that such fine particles may be used in their new form as a continuously moving filtering bed for the miscella on its way out of the extractor.

In some cases, such as when the original process material is low in oil content, the previously separated fines may, instead of being passed through a mechanical press for the purpose of extracting oil, be sent through an agglomerating machine or device and reduced in agglomerated form of the desired size without attempting to extract part of the oil. In the art, this operation is known as "pelleting."

In the separate processing hereinabove referred to, I provide in some cases for altering the original soluble content of the screened or separated fines. When processing oil bearing seeds this is preferably accomplished, first, by mechanically pressing such fines to press out oil and to reduce the screened or separated fines into the form of a cake and then by granulating it, or reducing them into pellet form, and preferably by altering the original moisture of the fines to increase their original specific weight, or by a combination of any or all of the above steps.

It will be understood (1) that the fines may be separated before the material is passed through the flaking rolls if such material is of a type that does not produce any fines during the flaking operation, as for example, oil-bearing seeds or nuts which are plastic and can be reduced into flake form without producing fines during this operation; (2) the fines may be separated after passage of the material through the flaking rolls; and (3) for materials that cannot be reduced into flake form, grinders are used to reduce the unflakable material into a physical form to suit the solvent extractor. If fines are produced during this operation, the separation of the fines will occur after the grinding.

If desired, a filter-aid such as cellulose or fibrous material in such form as to assist in the action of my prepared material as a filtering material may be added to the separated fines or to the processed fines.

In accordance with my present invention, the inlet section or zone of the extractor is divided into two sections, viz., a main entering or feeding section for process-material through which the main stream of material minus the fine particles that have been screened out as described above and through which inlet-section the miscella is not, on its way out of the extractor, allowed to pass, and an independent or separate inlet (which I shall designate as a "secondary inlet") for the specially-processed or prepared fine particles which will be so arranged as to provide the "meeting section" of the extractor, by which I mean the section of the extractor which is adjacent to the outlet for the outgoing stream of liquid miscella and through which said miscella moves in its passage from the extractor and within which section there is a normal tendency to carry with the miscella a certain amount of minute solid particles or fines, which in the usual process in an extractor, being buoyant in the miscella, are picked up by such miscella and separated from the solid process material containing them which is moving or passing in countercurrent with such miscella through the extractor.

In accordance with my instant invention, the miscella is allowed to percolate through the prepared material in this secondary inlet portion on its way out of the extractor with a resulting improved filtering action. The clarity of the discharged miscella will also be improved by the fact that the percentage of the fine particles originally contained in the main stream is no longer present in said main stream while the filtering action will be improved because the main stream does not cross the filtering section and because the fine particles originally present have been changed into a new physical form or agglomerated into particles of larger size by the processing or preparation hereinabove mentioned.

In accordance with my present invention the two streams of solids are joined together within the extractor below said meeting section and then travel together through said extractor.

My present invention is particularly useful in the continuous countercurrent solvent extraction of cottonseed, peanuts, flaxseed and other similar oil-bearing seeds and of packing-house by-products that have a tendency to partially disintegrate under the action of solvent in the extraction apparatus and that also have a tendency to produce a considerable amount of fine particles during their preparation to ready them for solvent extraction.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a diagrammatic view illustrating the steps used in my process and the apparatus including an extraction column in section that is employed in carrying out a preferred form of my invention;

Fig. 2 is a view in section of a modified form of extraction apparatus that may be employed in carrying out my invention;

Fig. 3 is a view in section of another modified form of extraction apparatus that may be employed by me; and Fig. 4 is a sectional view of still another form of apparatus that may be employed by me in carrying out my invention.

The main difference between my present invention and the prior art in filtering the outgoing miscella by the material going to the extractor is that in prior art apparatus and processes, the miscella percolates through a charge of material originally prepared for extraction and having the original physical characteristics that it had when leaving the preparation machinery, while in my present invention the miscella is caused to percolate through part of the original material which has been previously and separately processed in a special way and which enters the extractor through a special or independent inlet.

I shall describe my new process in detail, using as an example its utility in extracting cottonseed.

The cottonseed is first delinted and hulled in the conventional way, and in Fig. 1 I have shown a storage receptacle 1 of the hulled cottonseed meats. After conveyance by conveyor 2 and conventional conditioning in a conditioner 3, the meats are conveyed by conveyor 4 to and reduced into flake form by passage through conventional flaking rolls 5. The stream 6 of flakes from the flaking rolls 5 is then passed through a conventional reel or screen 7, and thus divided into two streams 8 and 9. The material remaining on top of the screen constitutes and is designated as the main stream 8 and is continuously and uninterruptedly conveyed to the extraction system or column 10 and, as shown, is introduced into said column 10 through the inlet 11, while the material that has passed through the screen constitutes and is designated as the secondary stream 9.

In the case of cottonseed, the secondary stream 9 is conveyed by conveyor 9$^a$ to and is passed through a continuous mechanical press 12 where a substantial part of the oil is mechanically removed and passed through pipe 13 to a suitable receptacle not shown and this oil, if desired, may be mixed with solvent extracted oil.

The cake from the press 12 is continuously conveyed by conveyor 9$^b$ and passed through a conditioner 15 where moisture is added and the temperature is raised for the purpose of preventing the creation of fines during a subsequent granulation or grinding operation in a granulator 16 to which the cake is passed by conveyor 9$^c$. The granulated fines coming from the granulator and, as hereinbefore stated, constituting the secondary stream 9 are conveyed by conventional means such as the conveyor 9$^d$ to the extractor 10 through inlet 17.

The miscella outlet 18 is located in a suitable place or point in the secondary inlet 17 so that miscella being discharged from the column 10 must percolate through a bed of material in said secondary inlet 17 before reaching the outlet. The miscella is forced to flow through the outlet 18 because the column of material 11$^a$ leading to the inlet 11, including the feed-hopper 11$^c$ extends to a higher level than does the column of material 17$^b$ and feed-hopper 17$^c$ connected with the inlet 17 and has no outlet for the miscella. The "meeting section," consequently, is located at the zone indicated and this section or zone contains only prepared material from the secondary stream 9 and the size of this conglomerated or granulated material is such that it cannot be carried out with the outgoing miscella flowing through said meeting section. The area of the meeting section will be calculated so as to control the velocity of the liquid miscella and to keep carrying power thereof below and in proper relationship with the size and specific gravity of the particles of material constituting the secondary stream.

The main stream 8 entering through the inlet 11 and the material constituting the secondary stream 9 entering through the inlet 17 will mix together in the zone 19 and then proceed through the extractor towards the exit, together with whatever fines were entrapped in the filtering bed.

It will be understood that the fine-separation which causes the creation of the main and the secondary streams may be accomplished at any point during the preparation of the material for solvent extraction. For instance, this separation may take place before the material to be extracted enters the flaking rolls, as described in companion application Ser. No. 102,742, filed July 2, 1949.

Fig. 2 shows another modified form of extraction apparatus for processing or extracting material from the main and secondary streams such as hereinabove described. In Fig. 2 two percolating zones are provided and the secondary stream enters laterally into the extraction column and is provided with a laterally-disposed intermediate feed-conduit 20. In other respects, it is substantially similar to the construction shown in Fig. 1, the higher column 21 being fed by the main stream 8 and the relatively-low column 22 being fed by the secondary stream 9.

Fig. 3 shows fragmentarily a modified form of an extraction column which contains annular screen 23 through which the miscella passes on its way out of the column, and an outer annular relatively-low column 24 of material fed from the secondary stream 9 while a centrally-disposed column 25 reaching to a higher level is suitably mounted within said outer column 24 and is fed from a main stream 8.

Fig. 4 illustrates another modified form shown in connection with a filter feeder. In this arrangement, at the bottom of the percolating bed in the column 26 I provide a proportion feeder 27 located so as to allow only a part of the processed granulated fines to be fed into the Redler conveyor 28. Without this proportion feeder, due to the characteristics of the Redler conveyor 28 the casing would be full of material coming from the hopper 26ª and no room would be left for material unloaded from the hopper 29ª of the column 29. The high column 29 is similarly fed by the main stream 8 and the relatively low column 26 is fed by the secondary stream 9.

Having described my invention, I claim:

1. A process for the solvent extraction of oil-bearing materials consisting in screening of a flaked solvent-extractable oil-bearing material to separate as screenings therefrom a quantity of minute particles comprising fines, mechanically pressing such minute particles derived from such screening to produce a product having granular pieces each composed of a compressed and granulated mass of coarser and increased size than said screening and of greater density than the material from which the granulated pieces were derived, and utilizing such compressed and granulated pieces as a filtering material in the extraction of the solvent-extractable oil-bearing material from which such compressed and granulated pieces have been derived.

2. A process for the solvent extraction of oil-bearing materials as claimed in claim 1 in which the compressed material is fed as a separate and independent miscella-filtering product into the meeting section of an extractor in a countercurrent extraction operation.

MICHELE BONOTTO.

REFERENCES CITED

The following references are of record in the file of this patent:

UNITED STATES PATENTS

| Number | Name | Date |
| --- | --- | --- |
| 1,694,361 | Sterling | Dec. 4, 1928 |
| 2,264,390 | Levine et al. | Dec. 2, 1941 |
| 2,430,535 | Schmidt et al. | Nov. 11, 1947 |
| 2,445,931 | Beckel | July 27, 1948 |